United States Patent

[11] 3,632,071

| [72] | Inventors | Douglas H. Cameron<br>New Lenox;<br>Roy A. Moody, Flossmoor; Arlie J. Thayer,<br>Tinley Park, all of Ill. |
|------|-----------|---|
| [21] | Appl. No. | 879,495 |
| [22] | Filed | Nov. 24, 1969 |
| [45] | Patented | Jan. 4, 1972 |
| [73] | Assignee | Panduit Tinley Park |

[54] MOUNT FOR RECEIVING AND RETAINING A STRAP
11 Claims, 20 Drawing Figs.

[52] U.S. Cl. .................................................. 248/74 PB,
24/16 PB, 248/205 A
[51] Int. Cl. .................................................. F16l 3/14
[50] Field of Search ........................................ 248/74, 74
PB:205 A; 24/16 PB, 73.7; 174/40.1

[56] References Cited
UNITED STATES PATENTS

| 1,971,396 | 8/1934 | De Waide | 248/205 A |
| 2,459,307 | 1/1949 | Churchill | 248/74 |
| 2,915,268 | 12/1959 | Wrobel | 248/74 |
| 3,454,249 | 7/1969 | Geisinger | 248/74 X |
| 3,542,321 | 11/1970 | Kahaba | 248/74 PB X |

FOREIGN PATENTS

| 695,251 | 9/1964 | Canada | 248/74 |
| 1,196,903 | 7/1965 | Germany | 248/74 |
| 1,577,220 | 6/1969 | France | 248/74 PB |
| 508,037 | 1/1955 | Italy | 24/16 PB |

*Primary Examiner*—Chancellor E. Harris
*Attorney*—Evan D. Roberts

ABSTRACT: A saddle for receiving and retaining a strap is disclosed herein, providing a structure whereby a saddle is pivotally or otherwise secured to a base. The base is provided with inspection apertures in the peripheral area thereof and the saddle is provided with a strap passage for receiving a strap in a direction generally toward the base. The saddle is a single piece or assembled from two or more pieces to provide the strap passage therein. The saddle is structured with projections and/or inclined surfaces adjacent the passage openings, whereby the passage openings open in a direction generally away from the mount base to facilitate reception of a strap.

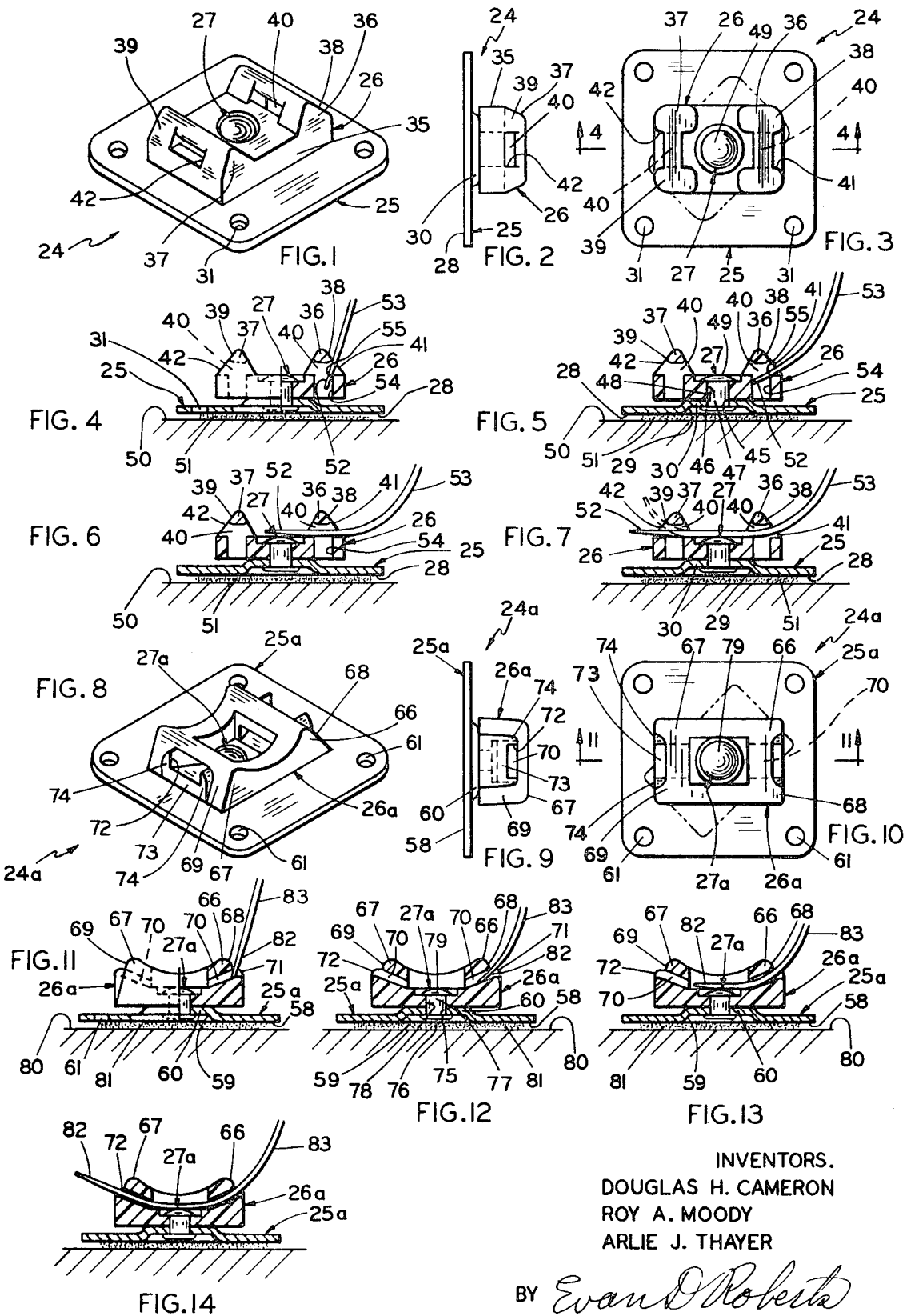

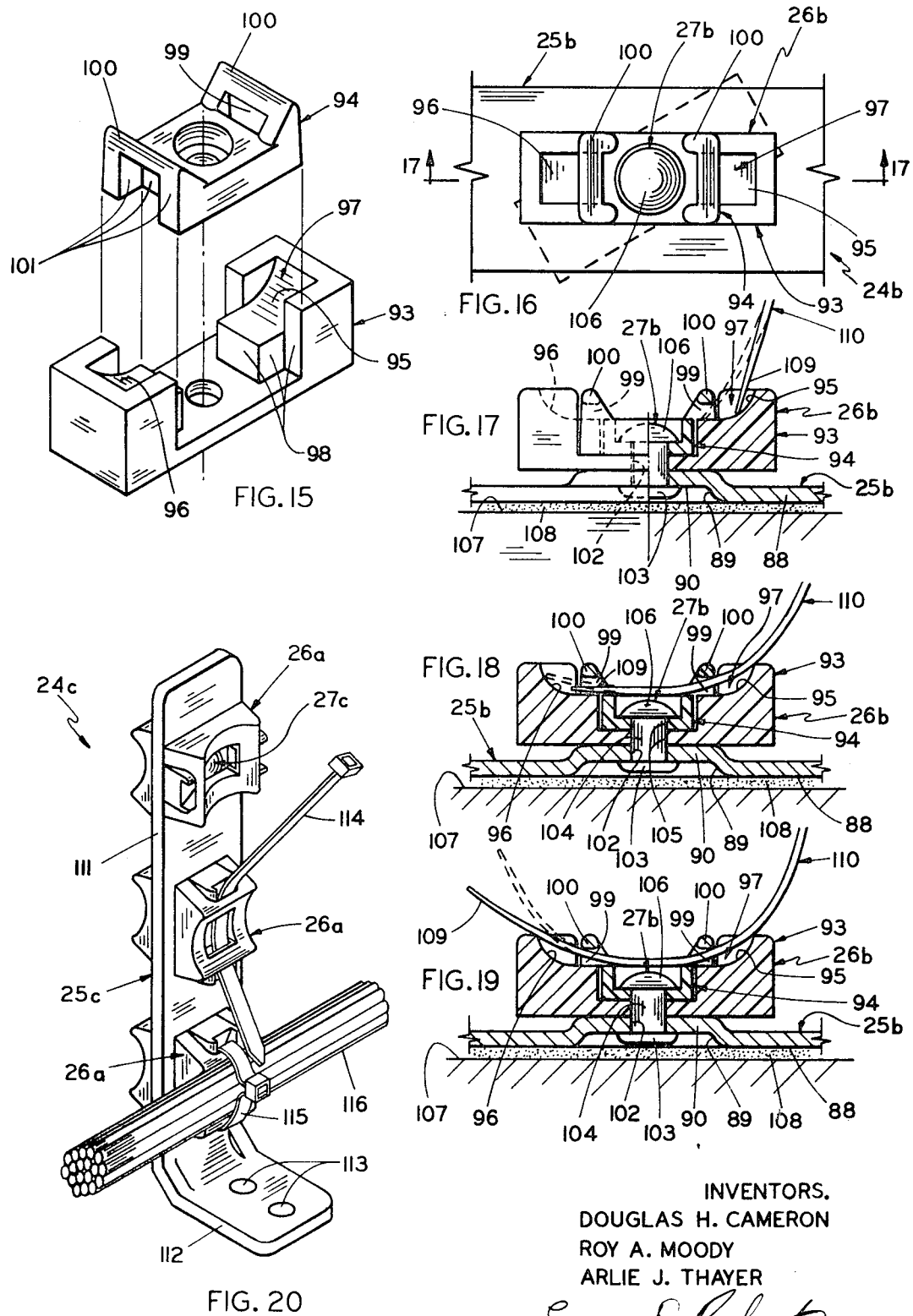

MOUNT FOR RECEIVING AND RETAINING A STRAP

SUMMARY OF THE INVENTION

This disclosure describes a mount, adapted to be secured to a surface, for receiving and retaining a strap which in turn may be utilized for supporting articles such as a bundle of cables of wires. The general structural embodiment concept of the mount or this invention generally includes a base for securing same to a surface, a separate saddle, and a means for securing the saddle to the base. The saddle, being a separate piece, facilitates provision of a base particularly adapted for securing the mount to a given surface independent of the composition of the saddle. The saddle is preferably made of plastic and has a passage therethrough with openings which open in a direction generally away from the base whereby a strap may be inserted in the saddle passage through the openings in a direction generally toward the base of the mount. The general embodiment provides a metal base having a securing surface which is preferably complemental to a surface to which it is to be secured. For purposes of simplicity, the securing surface is illustrated as flat and to be secured to a metal surface by a metal-to-metal adhesive. The saddle of the preferred embodiment has inclined surfaces across the passage therethrough to present passage openings exposed generally away from the base for receiving a strap directed generally toward the base, rather than from a lateral adjacent area where an obstruction may exist. This saddle is pivotally secured to the base, whereby the saddle may be pivoted on the base away from an adjacent obstacle to allow even more ready access to the passage. The base is provided with apertures therein for visual measurement of the presence of adhesive in the area between the base and the surface to which the base is secured by adhesives.

The second embodiment of this invention differs from the first embodiment by providing a curved saddle passage with a projection extension of the saddle passage which may be added along the bottom side of the passage openings adjacent the base and also along the sides of the passage openings extending away from the base to guide a strap into the passage.

The third embodiment of this invention differs from the first embodiment by providing a two-piece saddle wherein a curved saddle passage is provided by the configuration and interposition of the saddle pieces.

The mount of this invention is particularly adaptable to be secured to the surface by an adhesive whereby the presence of the adhesive is visually measurable through apertures in the base, and the strap passage is readily accessible from a direction away from the base independent of any close lateral proximity of an adjacent strap or mount, or of any other adjacent obstacle. Further, the saddle is pivotable on the base whereby a strap may be inserted in the saddle from a readily convenient position, and allowing the strap to be pivoted into any ultimately desired and possibly less convenient insertion position by pivoting the saddle to the desired position after the strap is inserted. The pivoted mounting of the saddle facilitates alignment of the saddle with the cables, wires, or other objects the saddle will retain in use independent of any possible base misalignment.

Other advantages and/or novel aspects of the invention will become apparent upon examination of the following detailed description, in conjunction with the following attached drawing wherein:

FIG. 1 is a perspective view of the preferred or first embodiment of the mount of this invention;

FIG. 2 is a side elevation view of the first embodiment of the mount of this invention;

FIG. 3 is a top view of the first embodiment of the mount of this invention;

FIG. 4 is a partial sectional view taken along line 4—4 of FIG. 3 showing the insertion of a strap into the saddle passage in a direction generally toward the base of the mount of this invention, and showing the adhesive inspection opening in the base.

FIG. 5 is a sectional view taken along line 4—4 of FIG. 3 showing the inserted strap of FIG. 4 being flexed and pivoted for further inspection in the saddle passage.

FIG. 6 is a sectional view taken along line 4—4 of FIG. 3 showing the strap in FIG. 4 inserted further in the saddle passage.

FIG. 7 is a sectional view taken along 4—4 of FIG. 3 showing the complete insertion of a strap in the saddle passage of the first embodiment of this invention.

FIG. 8 is a perspective view of the second embodiment of the mount of this invention.

FIG. 9 is a side elevation view of the second embodiment of the mount of this invention.

FIG. 10 is a top view of the second embodiment of the mount of this invention.

FIG. 11 is a partial sectional view taken along line 11—11 of FIG. 10 showing the insertion of a strap into the saddle passage in a direction generally toward the base of the mount.

FIG. 12 is a sectional view taken along line 11—11 of FIG. 10 showing the inserted strap of FIG. 11 being flexed and pivoted for further insertion in the saddle passage of the saddle of the second embodiment of this invention.

FIG. 13 is a sectional view taken along line 11—11 of FIG. 10 showing the strap in FIG. 11 inserted further in the saddle passage of the saddle of the second embodiment of this invention.

FIG. 14 is a sectional view taken along line 11—11 of FIG. 10 showing the complete insertion of a strap in the saddle passage of the second embodiment of this invention.

FIG. 15 is an exploded perspective view of the saddle of the third embodiment of the mount of this invention.

FIG. 16 is a partial top view of the third embodiment of the mount of this invention showing the saddle as being pivotable on the base of the mount.

FIG. 17 is a partial sectional view taken along line 17—17 of FIG. 16 showing the insertion of a strap into the saddle passage thereof in a direction generally toward the base of the mount.

FIG. 18 is a sectional view taken along line 17—17 of FIG. 16 showing the strap in FIG. 17 inserted further in the saddle passage of the saddle of the third embodiment of this invention.

FIG. 19 is a sectional view taken along line 17—17 of FIG. 16 showing the complete insertion of a strap in the saddle passage of the saddle of the third embodiment of this invention.

FIG. 20 is a perspective view showing multiple saddles of the second embodiment of the invention pivotally mounted on a single base to illustrate the pivotal characteristics of the saddle and the utilization thereof in an adjacent-mounting relationship.

The structure of this invention is exemplified by the illustrated first embodiment thereof (FIGS. 1-7) which is generally designated by the number 24 and includes generally, base 25, saddle 26, and means 27 for securing saddle 26 to base 25. Base 25 is preferably made of metal and is illustrated as having a flat securing surface 28 with a recess 29 (FIG. 5) formed by a raised center base portion 30. Inspection openings 31 are provided in the periphery of base 25 and preferably in the corners thereof if base 25 is rectangular as shown.

The saddle 26 is provided with a lower portion 35 and with an upper portion consisting of two projections 36 and 37. Projections 36 and 37 have inclined surfaces 38 and 39 respectively on the outer sides thereof and across a passage 40 extending through each projection 36 and 37 to provide apertures 41 and 42 respectively which open generally away from base 25.

Means 27 for securing the saddle 26 to base 25 in the preferred embodiment (FIGS. 1-7) is illustrated as a trunnion 27. Trunnion 27 is rigidly secured to raised base portion 30 (FIG. 5) in an aperture 45 (FIG. 5) by an expanded head 46. It should be noted that recess 29 provides clearance between base 25 and a surface 50 for expanded trunnion head 46. A bearing surface 47 is provided on trunnion 27 and is pivotally mounted in an aperture 48 in saddle 26. Saddle 26 is retained on trunnion bearing surface 47 by a trunnion head 49. Thus, trunnion 27 will pivotally retain the saddle 26 on base 25. Although trunnion 27 is described as being rigidly secured to base 25, trunnion 27 may be pivotally retained in base aperture 45, rigidly or pivotally secured in saddle aperture 48, and retained by trunnion heads 46 and 49.

In operation, surface 28 of base 25 may be secured to the surface 50 (FIGS. 4–7) by an adhesive 51 applied therebetween. The extent of the application of the adhesive may be visually checked by examination thereof through inspection openings 31 (FIG. 1, 3, and 4). After adhesive 51 is appropriately cured, a tip 52 of a strap 53 (FIG. 4) is then inserted generally toward the base 25 through and generally perpendicular to the aperture 41 in the inclined surface 38 of the saddle 26 and into a passage 54. Strap 53 thus inserted, will have the tip 52 thereof positioned adjacent or against a strap fulcrum edge 55 in saddle passage 40 (FIG. 4). Strap 53 is then gripped in close proximity to fulcrum 55 and forced generally downward and clockwise about fulcrum edge 55 to urge the tip 52 of strap 53 upwardly (FIG. 5) to align tip 52 of strap 53 with passage 40 (FIG. 6) in left projection 37 of saddle 26.

Strap 53 is, thereafter, urged downwardly (FIGS. 6 and 7) toward aperture 41 in the inclined surface 38 to urge strap 53 through the passage 40 and out through the other aperture 42 in inclined surface 39 of projection 37 in a direction generally away from the base 25. Strap 53 can then be gripped and urged upwardly adjacent aperture 42 as indicated in the broken lines (FIG. 7) and drawn through passage 40 whereby the ends of the strap can be secured together in a predetermined manner. The securing of the ends of the strap is not shown inasmuch as there are a number of known types of strap 53 which may be used for this purpose, none of which form a part of this invention.

Thus, the preferred embodiment of this invention (FIGS. 1–7) provides a mount 24 for a strap 53 whereby the strap may be inserted therein, in a direction generally toward base 25 of the mount 24, and the strap 53 can be extended through mount 24 and withdrawn from the other side thereof in directions generally toward and away from base 25 of mount 24 without interference from adjacent objects which might otherwise provide obstacles that would prevent ready insertion and withdrawal of strap 53 from mount 24. Further, the first embodiment of this invention 24 as illustrated (FIGS. 1–7) provides a structure wherein the saddle 26 for receiving and retaining a strap 53 is pivotally secured to base 25 of mount 24 whereby saddle 26 may be pivoted away from any immediate obstructions to permit ready insertion of a strap into a retaining passage through saddle 26 of the mount 24, after which the saddle can be pivoted to any desired position to allow utilization of the strap in the desired position.

This invention further exemplified by the illustration second embodiment thereof (FIGS. 8–14) which is generally designated as 24a and includes generally, base 25a, saddle 26a, and means 27a for securing saddle 26a to base 25a. Base 25a is preferably made of metal with a flat securing surface 58 (FIG. 12) and a recess 59 formed by a raised center base portion 60. Inspection openings 61 (FIGS. 8, 10, and 11) are provided in the periphery of base 25a and preferably in the corners thereof if base 25a is rectangular as shown.

The saddle 26a is provided with two general projections 66 and 67 (FIGS. 11 and 12). The projections 66 and 67 have inclined surfaces 68 and 69 respectively on the outer sides thereof and across a passage 70 extending through projection 66 and 67 of saddle 26a to provide general apertures 71 and 72 respectively which open generally away from base 25a. Passage 70 is generally curved with both ends thereof extending away from base 25a.

A bottom projection 73 (FIGS. 8–11) is provided on each inclined surface 68 and 69, respectively adjacent general apertures 71 and 72, and between apertures 71 and 72 and base 25a to extend the bottom of passage 70 beyond inclined surfaces 68 and 69. Projections 74 are provided on each side of general apertures 71 and 72, contiguous with the adjacent bottom projections 73. Bottom and side projections 73 and 74 provide extensions of passage 70 upwardly and outwardly from the base to guide any strap urged toward apertures 71 or 72 and toward base 25a through an arc as shown in FIG. 14 to exit upwardly from the other aperture away from the base 25a.

Means 27a for securing saddle 26a to base 25a in the second embodiment of this invention (FIGS. 8–11) are illustrated as a trunnion 27a which is substantially identical with trunnion 27 of the first embodiment of this invention. Trunnion 27a is rigidly secured to a raised base portion 60 in an aperture 75 (FIG. 12) by an expanded head 76. It should be noted that recess 59 provides clearance for expanded trunnion head 76. A bearing surface 77 is provided on trunnion 27a and is pivotally mounted in an aperture 78 in saddle 26a. Saddle 26a is retained on trunnion bearing surface 77 by a trunnion head 79. Thus, trunnion 27a will pivotally retain the saddle 26a on base 25a.

In operation, flat surface 58 of base 25a may be secured to a surface 80 (FIGS. 11–14) by an adhesive 81 applied therebetween. The extent of the application of the adhesive may be visually checked by examination thereof through inspection openings 61. After adhesive 81 is appropriately cured, a tip 82 of a strap 83 is inserted through the aperture 71 in the inclined surface 68 of saddle 26a and into passage 70 (FIG. 11). Strap 83 thus inserted, will have tip 82 thereof positioned in saddle passage 70 (FIG. 12).

Strap 83 thereafter is urged downward toward aperture 71 in inclined surface 68 to urge strap 83 through passage 70 and out through other aperture 72 in inclined surface 69 of projection 67 (FIGS. 13 and 14). Strap 83 can then be gripped and urged upwardly adjacent aperture 72 (FIG. 14), and drawn through passage 70 whereby the ends of the strap 83 can be secured together in a predetermined number. The securing of the ends of the strap 83 is not shown inasmuch as there are a number of known types of straps 83 which may be used for this purpose, none of which form a part of this invention.

Thus, the second embodiment of this invention (FIGS. 8–14) provides a mount 24a for a strap 83 whereby strap 83 may be inserted therein, in a direction generally toward base 25a of mount 24a, and strap 83 can be extended through mount 24a and withdrawn from the other side thereof in directions generally toward and away from base 25a of the mount 24a without interference from adjacent objects which might otherwise provide obstacles that would prevent ready insertion and withdrawal of strap 83 from mount 24a. Further, the second embodiment of this invention 24a illustrated (FIGS. 8–14) provides a structure wherein the saddle for receiving and retaining strap 83 is pivotally secured to base 25a of mount 24a whereby saddle may be pivoted away from any immediate obstructions to permit ready insertion of strap 83 into retaining passage 70 through the saddle of the mount, after which the saddle can be pivoted to any desired position to allow utilization of the strap in the desired position.

The structure of this invention is further exemplified by the illustrated third embodiment thereof (FIGS. 15–19) which is generally designated by the numeral 24b (FIG. 16) and includes generally, base 25b, saddle 26b, and means 27b for securing saddle 26b to base 25b. Base 25b is preferably made of metal with a flat securing surface 88 (FIG. 18) and a recess 89 formed by a raised center base portion 90. Inspection openings (not shown) like 31 and 61 provided in the periphery of bases 25 and 25a of the first and second embodiments of this invention are preferably provided in the periphery of base 25b.

Saddle 26b has a lower primary saddle element portion 93 and an upper secondary saddle element portion 94 (FIG. 15). Lower saddle portion 93 has two curved surfaces 95 and 96 formed by a general multisurface groove 97 (FIGS. 15–19).

The groove 97 of lower portion 93 also provides keying surfaces such as 98 adjacent each saddle surface 95 and 96. Upper saddle portion 94 is provided with passages 99 in projections 100 and is adapted to fit over and into groove 97 of lower portion 93 with surfaces such as 101 in complemental keying relationship with surfaces 98, and with passages 99 in respective registry with the portion of groove 97 forming the curved saddle surfaces 95 and 96.

Upper saddle portion 94 thus positioned within the groove 97 of lower saddle portion 93 provides a passage comprising the portion of the groove 97 adjacent curved saddle surfaces 95 and 96 and including passages 99 in upper saddle portion 94. It should be noted that this passage opens upwardly above curved saddle surfaces 95 and 96. Upper saddle portion 94 being thus positioned within groove 97 of lower saddle portion 93 and with surfaces 101 thereof in engagement with surfaces 98 of lower saddle portion 93, relative movement will be prevented between the upper and lower saddle portions 93 and 94 in the two horizontal directions (FIG. 16).

Means 27b for securing saddle 26b to the base 25b in the third embodiment (FIGS. 16–19) is illustrated as a trunnion 27b. Trunnion 27b is rigidly secured to raised base portion 90 in an aperture 102 by an expanded head 103. A bearing surface 104 (FIG. 18) is provided on trunnion 27b and is pivotally mounted in apertures 105 in lower and upper saddle portions 93 and 94 of saddle 26b. Saddle 26b is retained on trunnion bearing 27b by a trunnion head 106. Thus, trunnion 27b will pivotally retain saddle 26b on base 25b and retain lower and upper saddle portions 93 and 94 against vertical movement.

In operation, flat surface 88 of base 25b may be secured to a surface 107 (FIGS. 17–19) by an adhesive 108 applied therebetween. A tip 109 of a strap 110 is inserted downwardly toward the base into the exposed portion of groove 97 (FIG. 17) and against the inclined or curved surface 95 of saddle 26b. Strap 110 thus inserted, will have the tip 109 thereof positioned adjacent or against the right projection 100 in passage 99 as indicated by the broken line (FIG. 17).

Strap 110 is then gripped in close proximity to saddle 26b and forced generally downward to urge tip 109 of strap 110 through passage 99 in right projection 100 (FIG. 18) and to align tip 109 of strap 110 with passage 99 in left projection 100 of saddle 26b.

Strap 110 thereafter is urged downwardly toward the aperture above inclined surface 95 to urge strap 110 through groove 97 and passage 99 and into engagement with left-curved groove surface 96 as indicated by the broken lines (FIG. 18). Further downward urging of strap 110 will cause tip 109 to rise along surface 96 and emerge from the aperture above surface 96 of groove 97 (FIG. 19) in a direction generally away from the base 25b. Tip 109 of strap 110 can be gripped and urged upwardly adjacent projection 100 as indicated in the broken lines (FIG. 19) and drawn through groove 97 and passage 99 whereby the ends of the strap 110 can be secured together in a predetermined manner. The securing of the ends of the strap 110 is not shown inasmuch as there are a number of known type of straps which may be used for this purpose, none of which form a part of this invention.

Thus, the third illustrated embodiment of this invention (FIGS. 15–19) provides a mount 24b for a strap 110 whereby strap 110 may be inserted therein, in a direction generally toward base 25b of mount 24b, and strap 110 can be extended through mount 24b and withdrawn from the other side thereof in directions generally toward and away from base 25b of mount 24b without interference from adjacent objects which might otherwise provide obstacles that would prevent ready insertion and withdrawal of strap 110 from mount 24b. Further, the third embodiment of this invention 24b as illustrated (FIGS. 15–19) provides a structure wherein saddle 26b of mount 24b may be pivoted away from any immediate obstruction to permit ready insertion of strap 110 into groove 97 and retaining passage 99 through saddle 26b of mount 24b, after which saddle 26b can be pivoted to any desired position to allow utilization of the strap in the desired positions.

FIG. 20 illustrates a typical utilization 24c of the structure of this invention by securing saddle such as 26a (previously described) in lower, intermediate, and upper positions on an upper portion 111 of base 25c which could take several forms but which is illustrated as an angle base. Saddles 26a can be pivotally secured on upper portion 111 in pairs (as illustrated), singularly, or intermittently along the same or alternate sides of the upper portion 111 by trunnion 27c, similar to trunnions 27, 27a, and 27b previously described. Base 25c is also provided with a lower portion 112 adapted to be secured to a surface by an adhesive (not shown) which may be observed through inspection openings 113 in portion 112.

The structure shown in FIG. 20 further illustrates the versatility of the saddles such as 26a by showing the upper saddle 26a pivoted to move the passage openings thereof away from adjacent obstructions to allow a strap to be inserted therein. Also, the versatility of the saddles is shown by inserting strap 114 directly into the intermediate saddle notwithstanding adjacent obstructions such as a bundle of cables 116 retained by a strap 115 in an adjacent lower saddle 26a. In this situation the saddle passage is curved with the openings thereof facing generally away from the base 25c so that the strap 114 may be inserted therein generally toward the base 25c and may be withdrawn therefrom generally away from the base 25c to avoid such adjacent obstacles.

It is understood that the invention is not to be limited to the specific structures, arrangements, and mounting techniques shown and described, as it will be understood to those skilled in the art that changes may be made without departing from the principles of the invention.

What is claimed is:

1. A mount for receiving and retaining a strap comprising a base for securing the mount to a surface, a discrete saddle portion adjacent to said base and having a bottom surface adapted to be secured to said base, end surfaces inclining toward each other away from said base, a strap-receiving passage extending through said saddle portion between said end surfaces and terminating in apertures at each end surface so that each aperture is inclined and opens in a direction generally away from said base, said strap-receiving passage further having a bottom guiding surface adjacent each aperture, said aperture and said bottom guiding surface cooperating to permit the insertion of a strap into said passage in a direction generally toward said base and to guide the strap through said passage to the other aperture, and means securing said saddle portion to said base.

2. A mount as defined in claim 1 wherein said base is composed of metal and has a securing surface whereby said base can be secured by an adhesive adapted for metal-to-metal application independent of the composition of said saddle.

3. A mount as defined in claim 1 wherein said securing means is adapted to pivotally secure said saddle to said base.

4. A mount as defined in claim 1 wherein said securing means comprises a trunnion and bearing portion.

5. A mount as defined in claim 4 wherein said trunnion is rigidly secured to said base and pivotally retained in a bearing aperture portion in said saddle.

6. A mount as defined in claim 2 wherein said base has inspection holes therethrough adjacent the area of the periphery thereof to provide a visual measurement of the presence of adhesive in said peripheral area between said base and the surface to which said base may be secured by adhesive.

7. A mount as defined in claim 5 wherein said base is provided with inspection holes therethrough adjacent the area of the periphery thereof to provide a visual measurement of the presence of adhesive in said peripheral area between said base and the surface to which said base may be secured by adhesive.

8. A mount as defined in claim 1 wherein a projection is provided on one of said inclined surfaces between said passage opening in said inclined surface and said base to extend the surface of said passage most adjacent base for receiving and guiding a strap inserted in said passage opening and generally toward said base.

9. A mount as defined in claim 9 wherein said projection extends away from said base along said passage opening to guide a strap inserted into said opening.

10. A mount as defined in claim 1 wherein said strap-receiving passage is generally curved with the ends of said passage curved away from said base whereby a strap fed through said passage will enter and leave said passage toward and away from said base respectively.

11. A mount for defined in claim 1 wherein said base is provided with inspection holes therethrough adjacent the area of the periphery thereof to provide a visual measurement of the presence of adhesive in said peripheral area between said base and the surface to which said base may be secured, and a projection is provided on one of said inclined end surfaces between said passage opening in said inclines surface and said base to extend the surface of said passage most adjacent said base for receiving and guiding a strap inserted in said passage opening and generally toward said base.

* * * * *

UNITED STATES PATENT OFFICE
CERTIFICATE OF CORRECTION

Patent No. 3,632,071          Dated January 4, 1972

Inventor(s) Douglas H. Cameron, Roy A. Moody & Arlie J. Thayer

It is certified that error appears in the above-identified patent and that said Letters Patent are hereby corrected as shown below:

| | | |
|---|---|---|
| Column 1, | line 3 | "of" second occurrence should read --or--; |
| | line 5 | "or" should read --of--; |
| Column 3, | line 55 | "illustration" should read --illustrated--; |
| Column 4, | line 38 | "number" should read --manner--; |
| Column 5, | line 57 | "type" should read --types--; |
| Column 6, | line 8 | after "by" insert --a--; |
| Claim 8, | line 4 | after "adjacent" insert --said--; |
| Claim 9, | line 1 | cancel the numeral "9" and insert the numeral --8--; |
| Claim 11, | line 1 | cancel the word "for" and insert --as--; |

Front Page Item [73] Assignee "Panduit Tinley Park" should read -- Panduit, Tinley Park --.

Signed and sealed this 22nd day of August 1972.

(SEAL)
Attest:

EDWARD M. FLETCHER, JR.       ROBERT GOTTSCHALK
Attesting Officer               Commissioner of Patents